(12) United States Patent
Patel et al.

(10) Patent No.: US 12,441,069 B2
(45) Date of Patent: Oct. 14, 2025

(54) METHOD OF MANUFACTURING A TRIM PANEL

(71) Applicant: CpK Interior Products Inc., Port Hope (CA)

(72) Inventors: Manthan Pareshkumar Patel, Scarborough (CA); Bruce Arthur Giroux, Port Hope (CA); Gregory James Farrar, Roblin (CA); Collin James Goody, Cobourg (CA); Zachary Paul Fedak, Courtice (CA); Murali Mohan Reddy, Belleville (CA)

(73) Assignee: CPK Interior Products Inc., Port Hope (CA)

( * ) Notice: Subject to any disclaimer, the term of this patent is extended or adjusted under 35 U.S.C. 154(b) by 202 days.

(21) Appl. No.: 17/394,513

(22) Filed: Aug. 5, 2021

(65) Prior Publication Data

US 2023/0041610 A1 Feb. 9, 2023

(51) Int. Cl.
| | |
|---|---|
| *B29C 45/16* | (2006.01) |
| *B29C 45/14* | (2006.01) |
| *B29C 70/78* | (2006.01) |
| *B29L 31/30* | (2006.01) |

(52) U.S. Cl.
CPC .......... *B29C 70/78* (2013.01); *B29C 45/1418* (2013.01); *B29C 45/14508* (2013.01); *B29C 45/1671* (2013.01); *B29C 2791/001* (2013.01); *B29L 2031/3041* (2013.01)

(58) Field of Classification Search
CPC ............ B29C 45/1635; B29C 45/1676; B29C 45/1675; B29C 2045/1637; B29C 2045/1673
See application file for complete search history.

(56) References Cited

U.S. PATENT DOCUMENTS

| | | | | |
|---|---|---|---|---|
| 4,161,060 | A * | 7/1979 | Lenne .................... | B29D 12/02 425/127 |
| 4,701,999 | A * | 10/1987 | Palmer .................. | H01L 23/057 257/667 |
| 4,944,908 | A * | 7/1990 | Leveque ........... | B29C 45/14639 216/36 |
| 5,824,251 | A | 10/1998 | Morrison et al. | |
| 6,174,482 | B1 * | 1/2001 | Reames ............ | B29C 45/14434 264/250 |
| 6,413,461 | B1 | 7/2002 | Kobayashi et al. | |

(Continued)

OTHER PUBLICATIONS

"Clearmelt®: Surface Unlimited—PUR in-Mould-Coating" presentation by Hennecke (received prior to Aug. 2021).

(Continued)

*Primary Examiner* — Edmund H Lee
(74) *Attorney, Agent, or Firm* — Harness, Dickey & Pierce PLC

(57) ABSTRACT

An over-molded interior trim method and system are provided. In another aspect, a method of manufacturing a trim panel includes: injecting a liquid substrate polymer between molds to create a substrate, injecting a liquid urethane polymer into a cavity directly against the substrate to create a skin or cover, flowing or wrapping in a mold the urethane polymer around at least one peripheral edge of the substrate, and extending the urethane polymer onto a backside of the substrate.

24 Claims, 10 Drawing Sheets

(56) References Cited

U.S. PATENT DOCUMENTS

| | | | |
|---|---|---|---|
| 6,548,001 B1* | 4/2003 | Lichtinger | B60J 1/08 264/161 |
| 7,070,724 B2* | 7/2006 | Nakazawa | B29C 45/572 264/328.8 |
| 7,404,916 B2 | 7/2008 | Begemann et al. | |
| 7,560,515 B2 | 7/2009 | Tansey | |
| 7,572,401 B2 | 8/2009 | Cowelchuk et al. | |
| 8,088,318 B2 | 1/2012 | West et al. | |
| 8,505,997 B2 | 8/2013 | Hipshier et al. | |
| 8,506,003 B2 | 8/2013 | Smith et al. | |
| 9,969,338 B1 | 5/2018 | Kajitani et al. | |
| 2004/0056382 A1* | 3/2004 | Shaner | B29C 45/1676 264/328.8 |
| 2004/0227271 A1* | 11/2004 | Takebe | H01H 13/88 264/255 |
| 2005/0046075 A1* | 3/2005 | Youngs | B29C 45/1635 425/129.1 |
| 2005/0227043 A1* | 10/2005 | Schoemann | B32B 3/06 428/137 |
| 2006/0022381 A1* | 2/2006 | Brozenick | B32B 7/12 264/273 |
| 2015/0306838 A1* | 10/2015 | Ito | B32B 3/04 428/189 |
| 2017/0240736 A1 | 8/2017 | Farrar | |
| 2019/0316390 A1* | 10/2019 | Wilke | B29C 45/0013 |

OTHER PUBLICATIONS

Photograph of automobile trim panel with hand-wrapped cover (offered for sale or publicly used prior to Aug. 2021).

* cited by examiner

METHOD OF MANUFACTURING A TRIM PANEL

BACKGROUND AND SUMMARY

The present disclosure relates generally to an interior trim system, and more particularly to an over-molding system and method for manufacturing an interior trim panel.

Traditionally, automotive vehicle interior trim panels, such as those used in center consoles, instrument panels, door panels and pillar panels, have soft-feel outer skins covering a rigid injection molded substrate, often with a flexible foam injected therebetween. Skins for such interior trim panels are typically polyvinyl chloride ("PVC"), thermoplastic polyurethane ("TPU"), thermoplastic polyolefin ("TPO") or thermoplastic elastomers ("TPEs"). Furthermore, these conventional skins are made by slush rotational molding or thermoforming. Examples of three-step slush molding are disclosed in U.S. Patent Publication No. 2017/0240736 entitled "Polyvinylchloride for Seamless Airbag Doors" invented by Farrar, and U.S. Pat. No. 7,560,515 entitled "PVC Alloy for Use in Air Bag Doors" which issued to Tansey on Jul. 14, 2009, both of which are incorporated by reference herein. Such conventional slurry and foamed panels, however, require many different molding tools, and are expensive and time consuming to manufacture.

Thermoforming first makes a substrate by injection molding then vacuum forms a skin thereto in a separate machine. As a second step, an edge folding machine wraps the skin around the edges of the substrate. Then the excess folded skin is removed by cutting, all of which is time consuming and prone to many tolerance variations.

Various other multilayer configurations have been attempted for making two-shot interior trim panels which first injection or thermoform mold a substrate and subsequently inject another material into the same cavity. Examples of such a two-shot method are disclosed in U.S. Pat. No. 8,088,318 entitled "Method for Processing an Interior Trim Component" which issued to West et al. on Jan. 3, 3012; U.S. Pat. No. 7,572,401 entitled "Insert Molded Bolster in Two-Shot Door Panel" which issued to Cowelchuk et al. on Aug. 11, 2009; and U.S. Pat. No. 5,824,251 entitled "Method for Forming Plastic Molded Panels with Inserts" which issued to Morrison et al. on Oct. 20, 1998. All of these patents are incorporated by reference herein. These traditional approaches, however, all have unsightly raw peripheral edges and/or undesirably require manual folding over and gluing of the outer skin around the peripheral edges of the internal substrate. Moreover, U.S. Pat. No. 9,969,338 entitled "Interior Component" which issued to Kajitani et al. on May 15, 2018, recognizes the problem of unsightly wrinkles and adhesive concerns from difficult skin folding around edges; this patent is also incorporated by reference herein.

In accordance with the present invention, an over-molded interior trim method and system are provided. In another aspect, a method of manufacturing a trim panel includes: injecting a liquid substrate polymer between molds to create a substrate, injecting a liquid urethane polymer into a cavity directly against the substrate to create a skin or cover, flowing or wrapping in a mold the urethane polymer around at least one peripheral edge of the substrate, and extending the urethane polymer onto a backside of the substrate. A further aspect includes damming a flow of an encapsulating urethane skin within the cavity by the liquid urethane abutting against a wall surface upstanding from the backside of the substrate. Yet another aspect of the present system includes an edge wrapped portion of a skin cover spanning across both sides of the mold parting line with a Class-A surface portion of the skin cover being on one side of the parting line and a backside portion of the skin cover being on another side of the parting line. Another aspect of the present system includes mold-wrapping a skin around a peripheral edge of a substrate with the skin having a soft feel and more resilient durometer as compared to the more rigid and thicker substrate. In still another aspect, an over-molded, automotive vehicle trim panel, such as an instrument panel, floor-mounted center console panel, airbag cover, door trim panel, knee bolster, seat mechanism cover panel, pillar cover panel, package shelf panel or the like, includes a substrate with a periphery-encapsulating and soft-feel skin thereon.

The present method and system are advantageous over conventional devices. For example, the present method manufactures an over-molded trim panel in a single cycle, from initial injection mold closure through removal of the cooled and skin-covered final part from the molds, in 2-6 minutes, more preferably in 2-5 minutes, and most preferably in 2-4 minutes, as compared to more than 10 minutes for a traditional substrate molding, slush molding and foaming processing cycle, and as compared to more than 7 minutes for traditional injection molding a substrate, vacuum forming a skin and subsequent manual edge wrapping. The present method and system additionally avoid optional foam-in-place steps which otherwise add complexity, mess, time and expense. Thus, the present method and system are considerably faster, less complicated and less expensive to produce. Furthermore, manufacturing tolerances and accuracy are improved with the present method and system since the substrate remains in a common mold throughout all of the steps.

Also, the present method and system beneficially improve the wrapped edge appearance of the trim panel since conventional manual skin wrapping and the associated wrinkles and unevenness of folds, with adhesive and/or staples are not employed. A soft feel and resiliency of the skin can be achieved by a combination of novel part design, mold design, processing integration and skin material characteristics, while not requiring a separate foaming process between the skin and the substrate. All of these quality, cost and appearance advantages may be realized by synergistically using urethane to encapsulate at least one, and preferably all, peripheral edges of the substrate, while the urethane also extends onto a backside of the substrate. A novel interior trim panel made with the present method is provided, as is a unique mold system construction. Additional features and advantages can be ascertained from the following description and appended claims taken in conjunction with the accompanying drawings.

DETAILED DESCRIPTION

Figure 1:
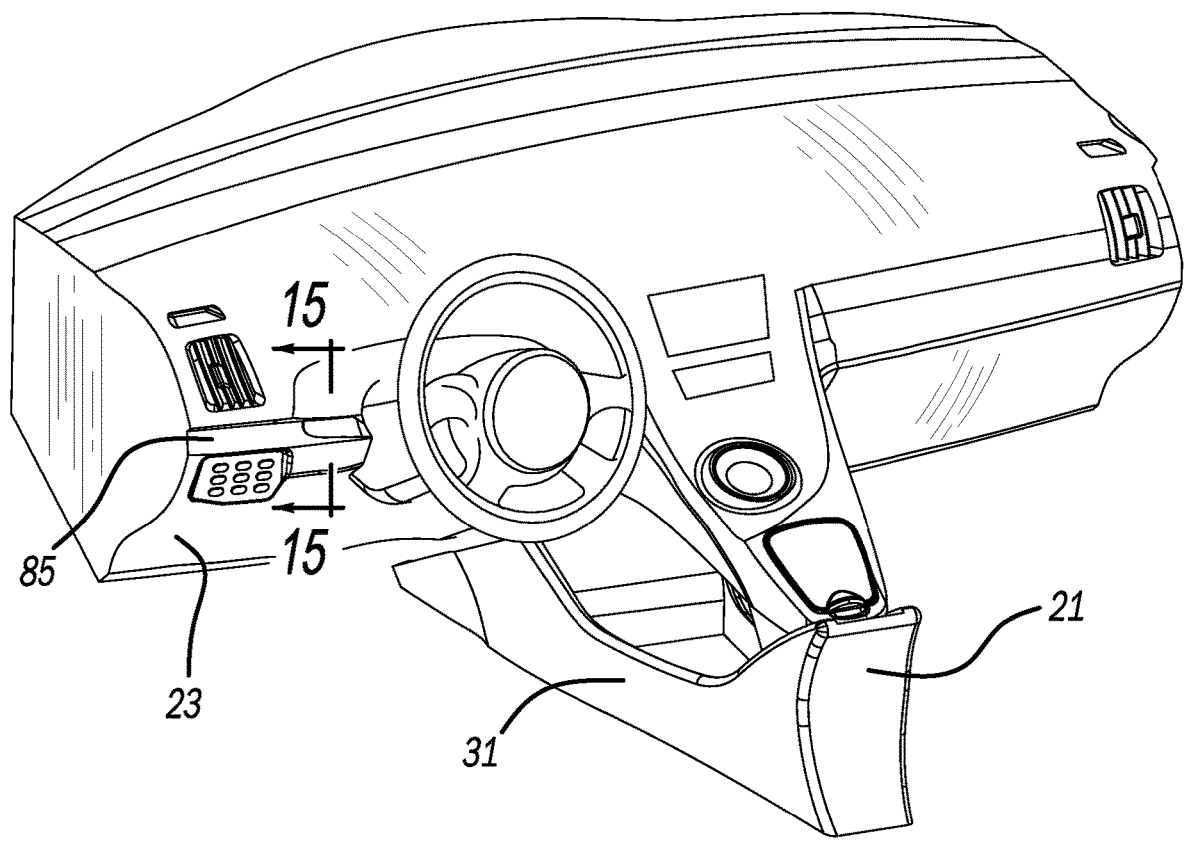
FIG. 1 is a perspective view showing the present interior trim system applied to an instrument panel and center floor console.
Figure 3:
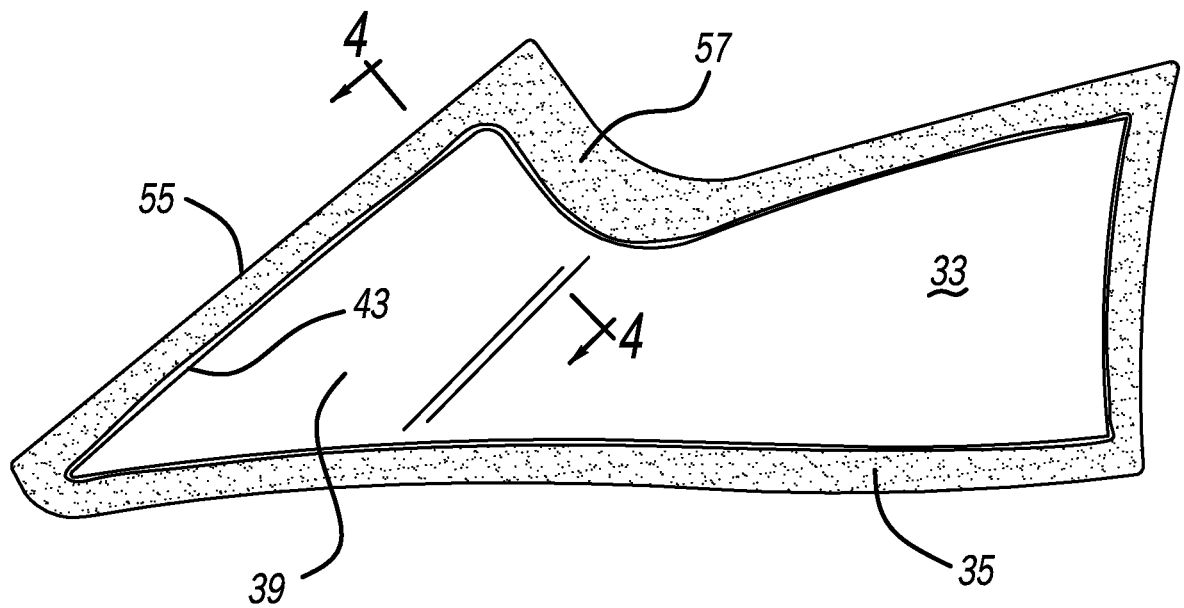
FIG. 3 is a backside elevational view showing a skin over-molded onto the substrate of the present interior trim system.
Figure 13:
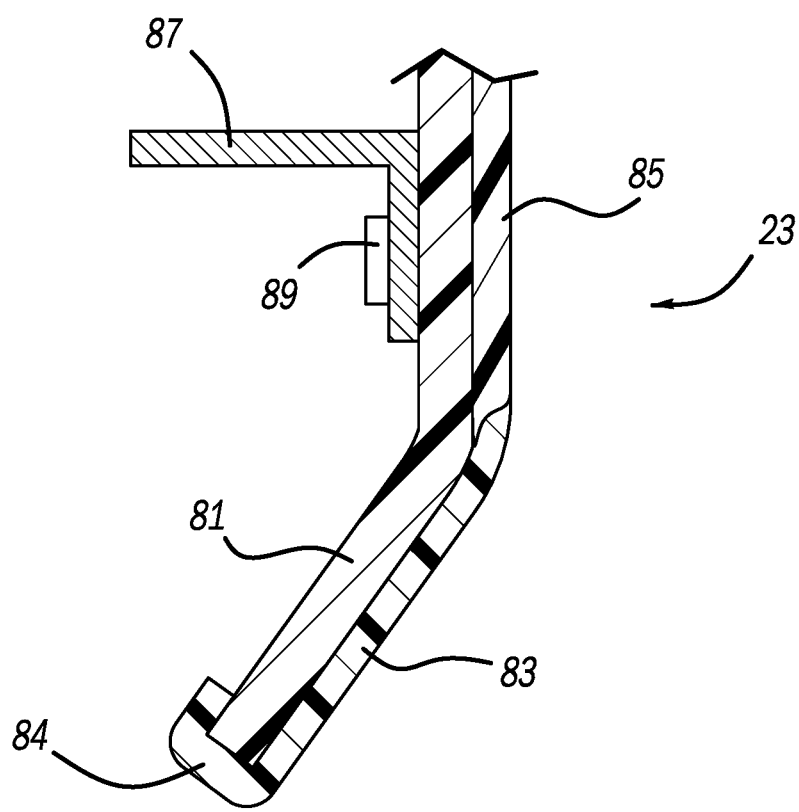
FIG. 13 is a fragmentary, cross-sectional view, taken along line 13-13 of FIG. 1, showing an instrument panel embodiment of the present interior trim system.
Figure 14:
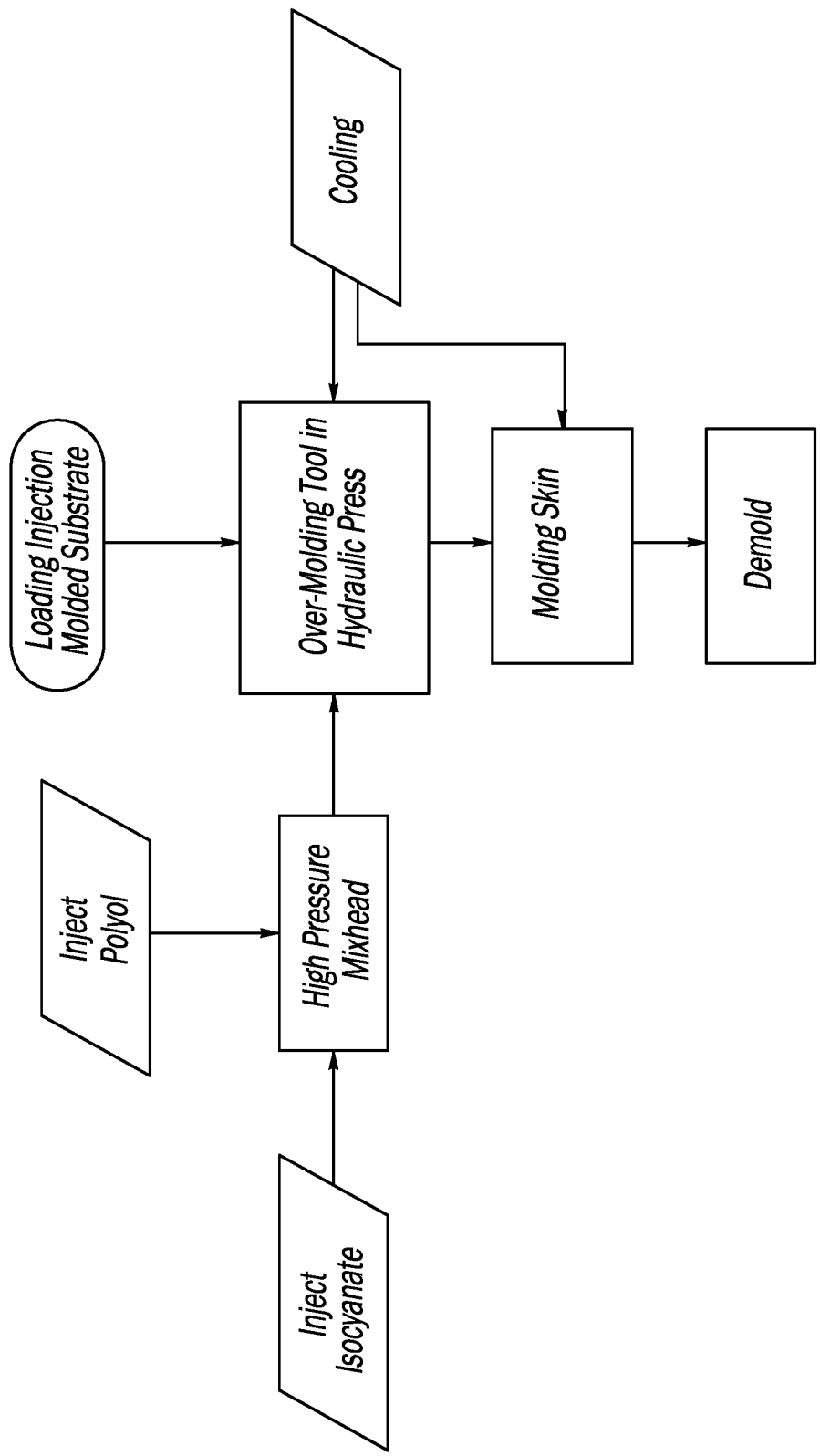
FIG. 14 is a flow chart showing processing steps used to manufacture the present interior trim system.

An interior trim panel for a wheeled automotive land vehicle is shown in FIGS. 1 and 3 as part of a floor mounted, center console 21. Alternately, FIGS. 1 and 13 illustrate the interior trim panel as part of an instrument panel and knee bolster assembly 23, while in another configuration of the present system, a door trim panel 25 can be observed in FIG. 14. Alternately, the present interior trim panel can include a separate airbag cover, a seat mechanism cover, a pillar trim cover, a package shelf, or the like.

Figure 2:
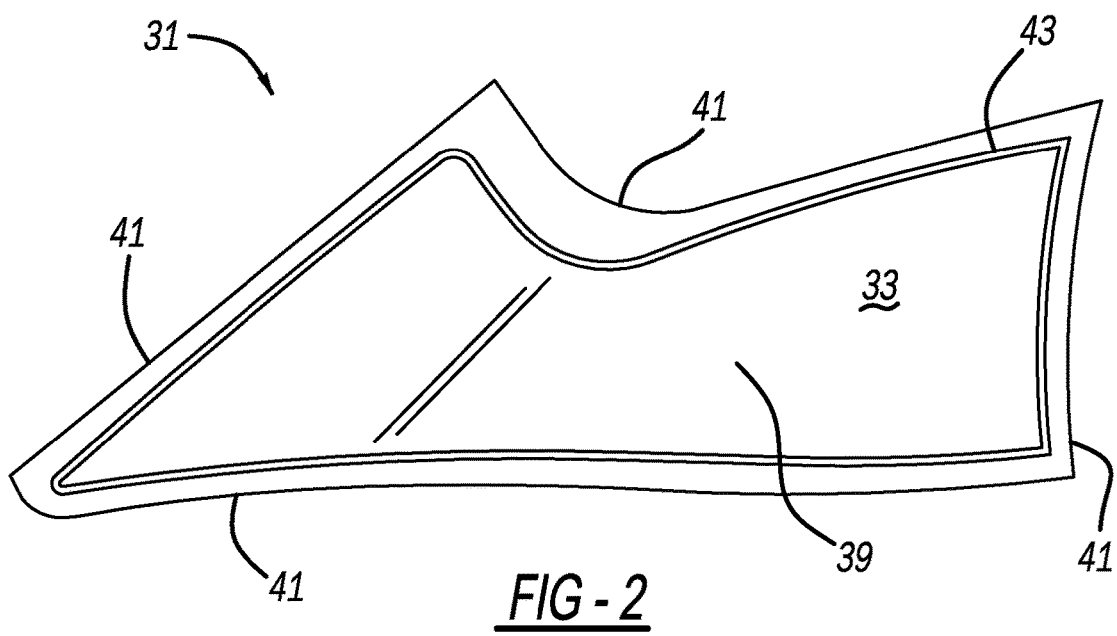
FIG. 2 is a backside elevational view showing a substrate employed in the center floor console of the present interior trim system.
Figure 4:
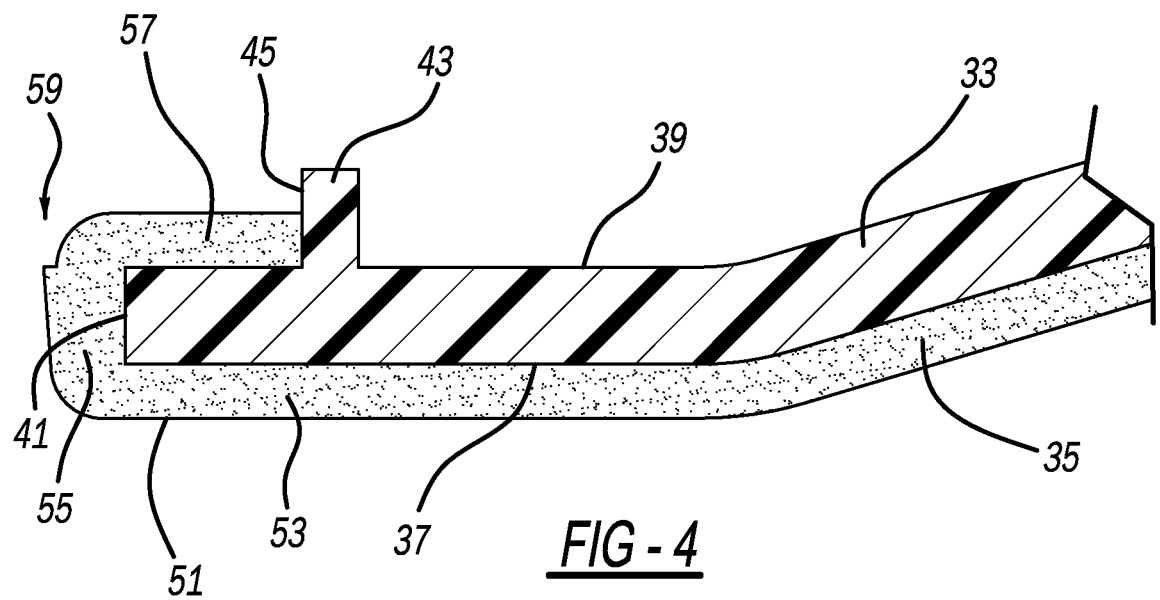
FIG. 4 is a fragmentary, cross-sectional view, taken along line 4-4 of FIG. 3, showing the present interior trim system.
Figure 5:
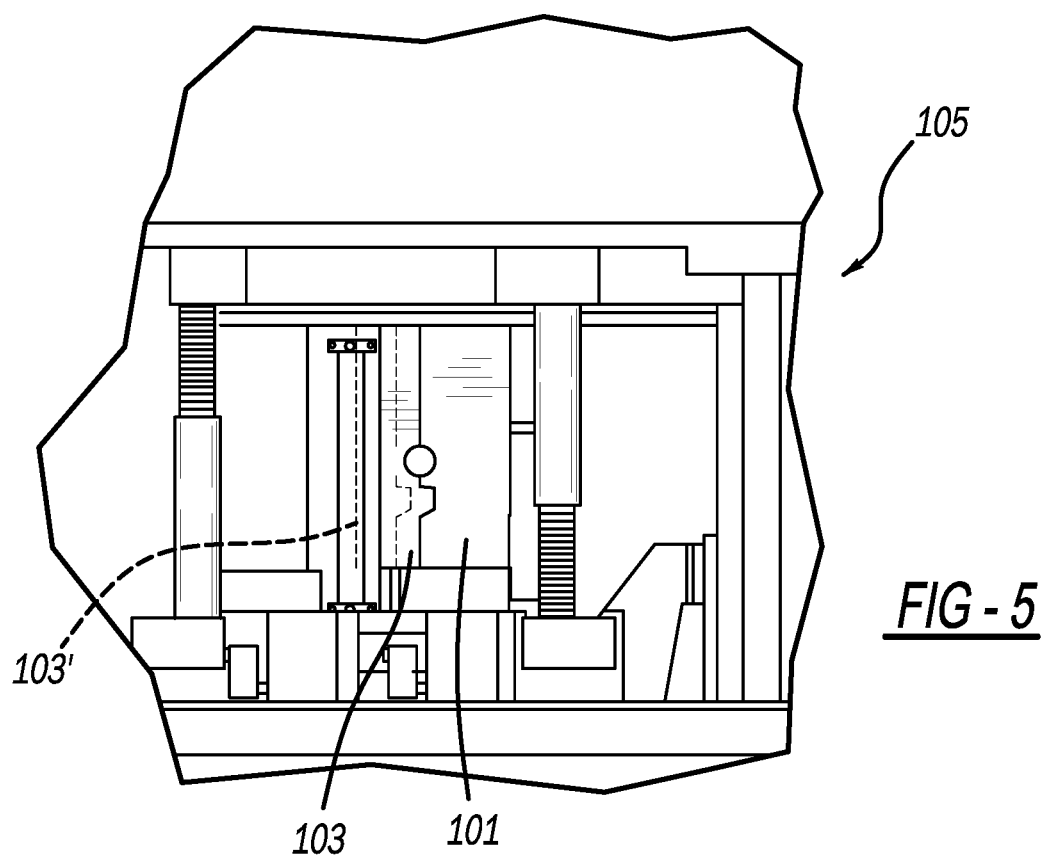
FIGS. 5-7 are side elevational views showing a sequence of mold motions of the present interior trim system.

Referring to FIGS. 2-4, an exemplary interior trim panel 31 of center console 21 includes an inner and generally rigid substrate 33 directly in contact with and covered by an outer skin 35. Substrate 33 has an outer surface 37, an opposite backside surface 39 and peripheral edges 41. Furthermore, a continuous wall or rib 43 upstands from backside surface 39 such that wall 43 has a dam surface 45 within 85-99° offset angled from the backside surface, while dam surface 45 faces toward and is generally parallel (within 10 degrees) of peripheral edges 41.

Skin 35 has a Class-A appearance outer surface 51 on an outer layer 53, a backside of which being in direct contact with outer surface 37 of substrate 33. Moreover, skin 35 also includes a wrapped or turned end 55 and a return section 57, a backside of which is in direct line-to-line contact with peripheral edge 41 and backside surface 39 of substrate 33, respectively. No adhesives or fasteners (such as staples) are used to secure the skin to the substrate. Thus, skin has a generally J-shaped cross-section (as illustrated in FIG. 4) at at least one, and more preferably, all peripheral edges of the substrate, with return section 57 being generally parallel to outer layer 53 adjacent end 55. No folds or wrinkles are in the end or return layer of the skin. Optionally, a continuously extending step 59 may be located at a mold parting line on end 55 of the skin, to provide an aesthetically pleasing draft angle transition, or the end may instead have a cross-sectional curve with its peak located at the parting line. The outer surfaces of the substrate and skin are preferably three-dimensionally curved along their length, but may alternately be flat.

Substrate 33 is preferably made from a polymeric material primarily including one of: ABS, PC-ABS, SLA or PP. Skin 35 is preferably made from a polymeric material primarily including thermoplastic polyurethane ("TPU"). A nominal middle section of the substrate, after removal from the forming molds, is about 1.5-4 mm thick; a nominal middle section of the skin, after removal from its forming molds, is about 0.5-1 mm thick; and the skin, after removal from the molds, has a Shore A hardness=33-68. Therefore, a majority of the substrate is thicker than is a majority of the skin, at least in the nominal middle sections thereof.

Exemplary polymeric materials suitable for skin are the Elastoskin® 51130R and 51340R resins which may be obtained from BASF. Exemplary and nonlimiting properties of the skin used in the present system are approximately: Shore A hardness=33-90 (more preferably 33-68), Shore A hardness (after 5 seconds)=52-65, tensile strength=9.9-10.2 Mpa, tensile strength at 504 hours and 110° C.=7.5-14.9 Mpa, elongation=292-306%, elongation at 504 hours and 110° C.=316-651%, tear strength=45.9-48.4 kN/m, and tear strength at 504 hours and 110° C.=43.6-64.4 kN/m. Therefore, the skin has a soft feel and is more resiliently compressible to the touch than is the more rigid underlying substrate. Additionally, outer surface 51 of skin 35 preferably has a textured pattern molded therein.

Turning to FIG. 13, the exemplary instrument panel 23 includes a generally rigid, polymeric substrate 81 at least partially covered on an outside thereof by a resilient and soft feel skin 83. An integrally edge wrapped configuration 84 is provided similar to that discussed above. Foaming-in-place between the skin and substrate is not needed since the skin is created with a resilient soft feel.

Optionally, an aesthetic trim plate or bezel member 85, such as providing a wood grain or chrome appearance, can be in-molded and secured directly to substrate 81 by edge-overlapping skin 83. However, it should be appreciated that an adhesive may temporarily retain member 85 to the substrate until the skin is subsequently added. Alternately, member 85 can be molded in an additional step directly onto an exterior of skin 83 in the same set of tools, or less beneficially, separately stamped or formed and thereafter manually fastened thereto.

An optional fastener or reinforcement bracket member 87 can be in-molded into a backside portion of substrate 81. In this situation, fastener or bracket member 87 is preferably molded in the same set of tools, or alternately separately molded or stamped and then manually inserted into the substrate mold. The substrate is then molded such that a post 89 or other section thereof flows through a hole in member 87 so as to integrally secure it to the backside of the substrate. The manufacturing method and construction of backside member 87 and/or outer member 85 may be used with any of the embodiments disclosed herein.

Figure 15:
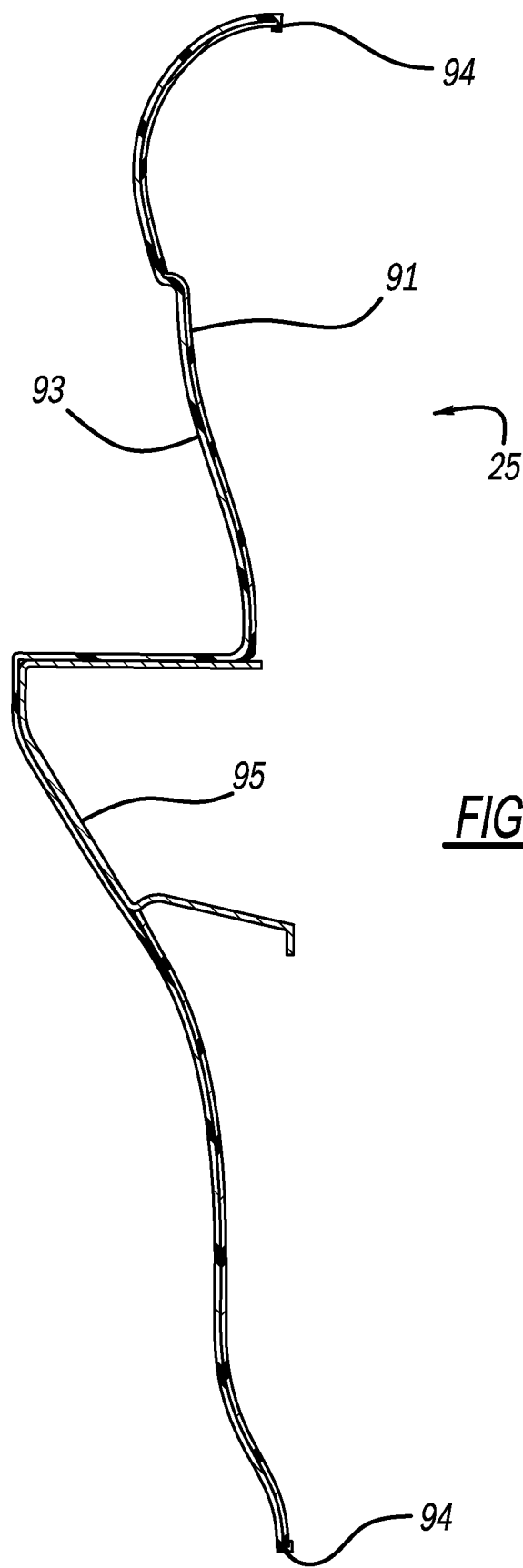
FIG. 15 is a cross-sectional view showing a door trim panel embodiment of the present interior trim system.
Figure 16:
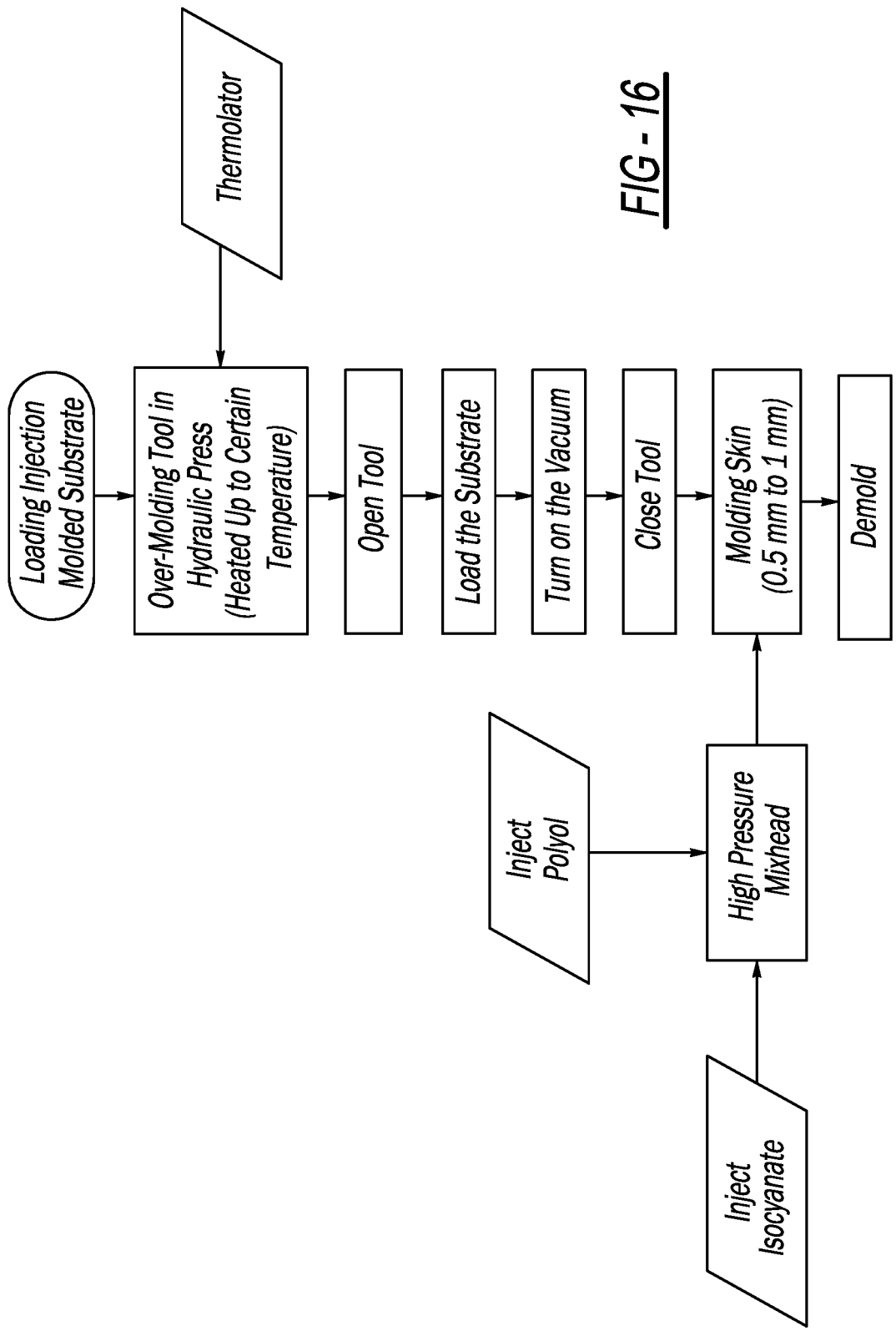
FIG. 16 is a flow chart showing processing steps used to manufacture the present interior trim system.

FIG. 15 shows the exemplary interior door trim panel 25 which includes a generally rigid, polymeric substrate 91 at least partially covered on an outside thereof by a resilient and soft feel skin 93, in an integrally edge wrapped configuration 94 similar to that discussed above. A rigid and structural, polymeric or metallic armrest reinforcement 95 may locally replace or be insert molded on a backside of substrate 91. Therefore, the substrate, skin and armrest reinforcement are integrally molded and attached together such that they are removed from the final skin mold as a single piece. Optionally, fasteners may also be insert molded into the backside of the substrate 91. Again, foaming-in-place between the skin and substrate is not needed since the skin is created with a resilient soft feel.

The tooling and manufacturing process for the center console trim panel (which is also applicable to the other trim panel embodiments) will now be discussed with reference to FIGS. 4-12, 14 and 16. First, a pair of matching metallic substrate molds or tools 101 and 103 are closed and clamped together in a hydraulically powered, press machine 105. An injection molding barrel and associated nozzle (shown as a circle in FIG. 8) interface with a gate 123 of the molds at a parting line 127 such that they inject heated and liquid polymeric material in a cavity defined by the contoured gap between the closed molds 101 and 103. This creates substrate 33 in the cavity which is then cooled within the molds.

Figure 6:
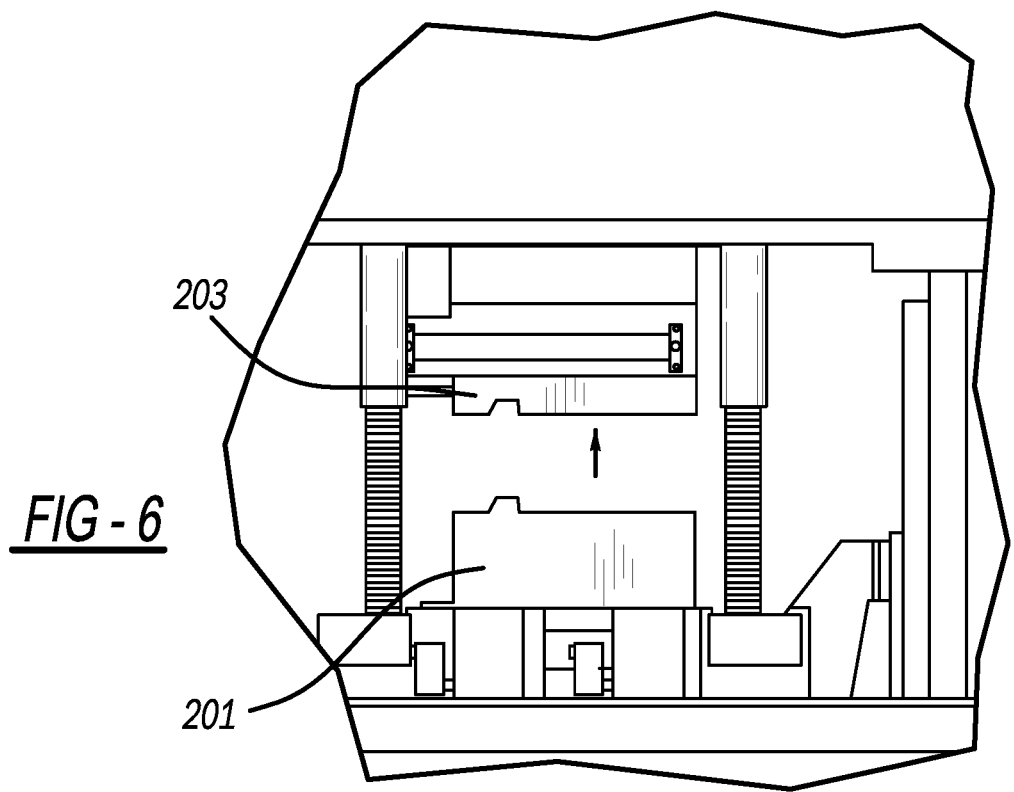
Figure 7:
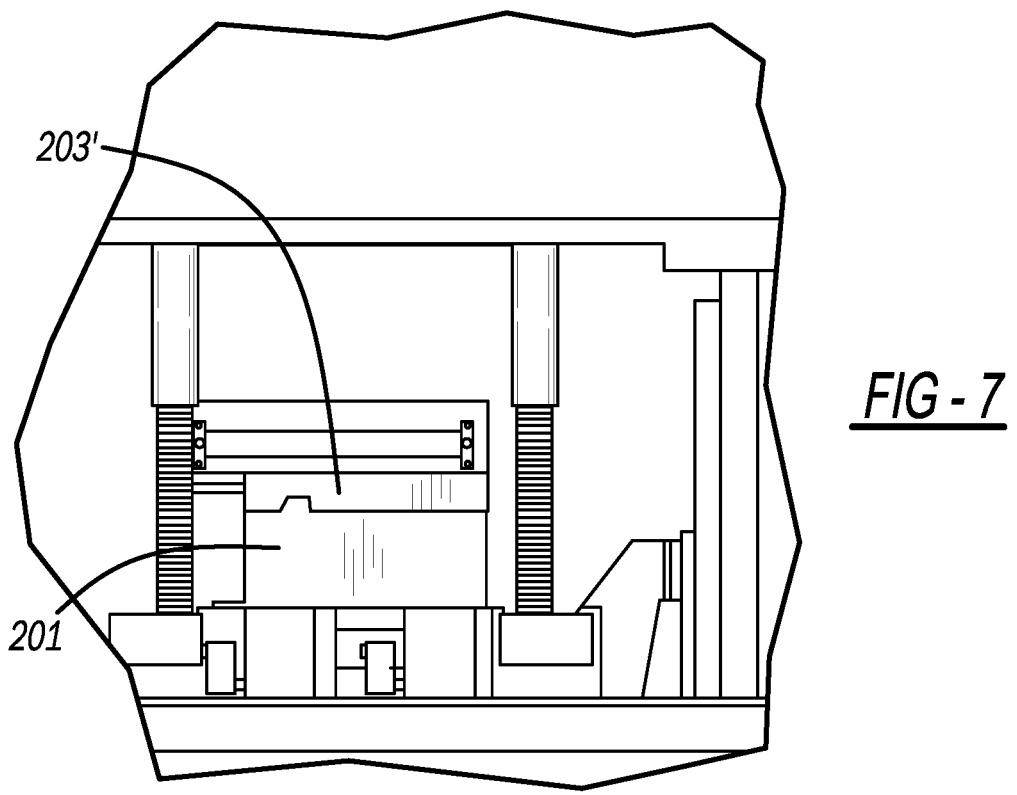
Figure 8:
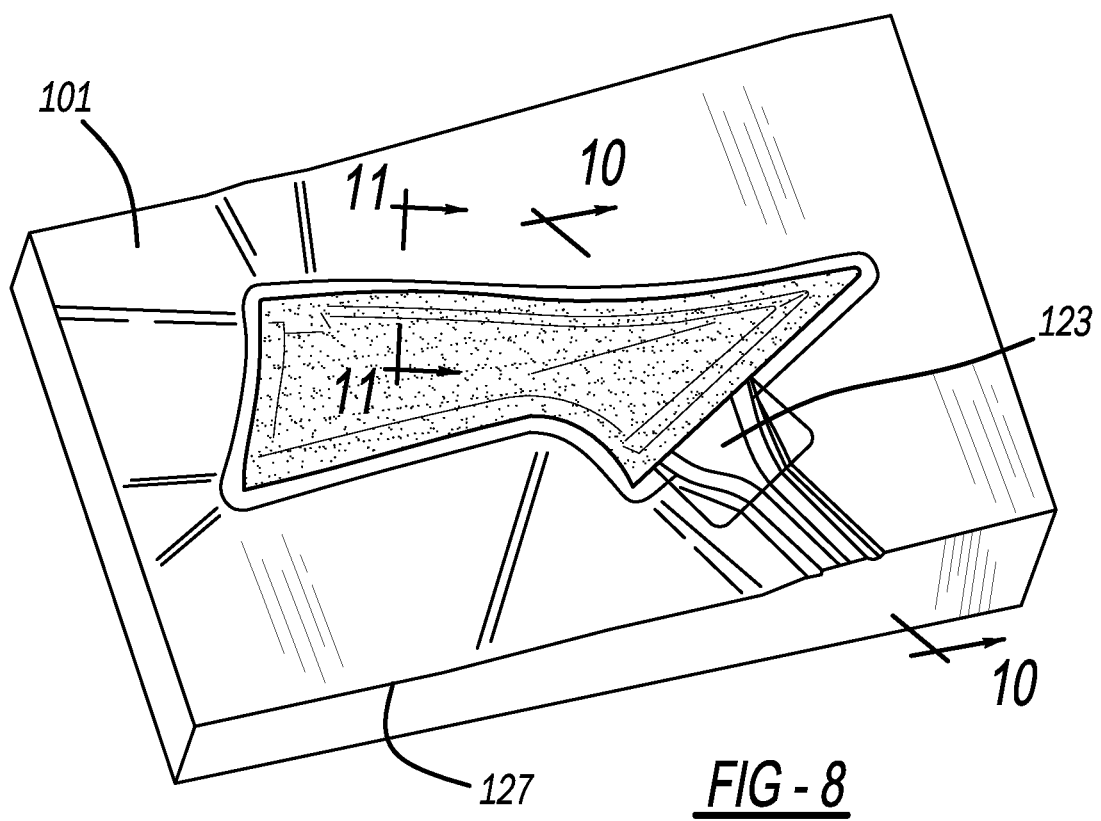
FIGS. 8 and 9 are perspective views showing molds for making the substrate and skin of the present interior trim system.
Figure 9:
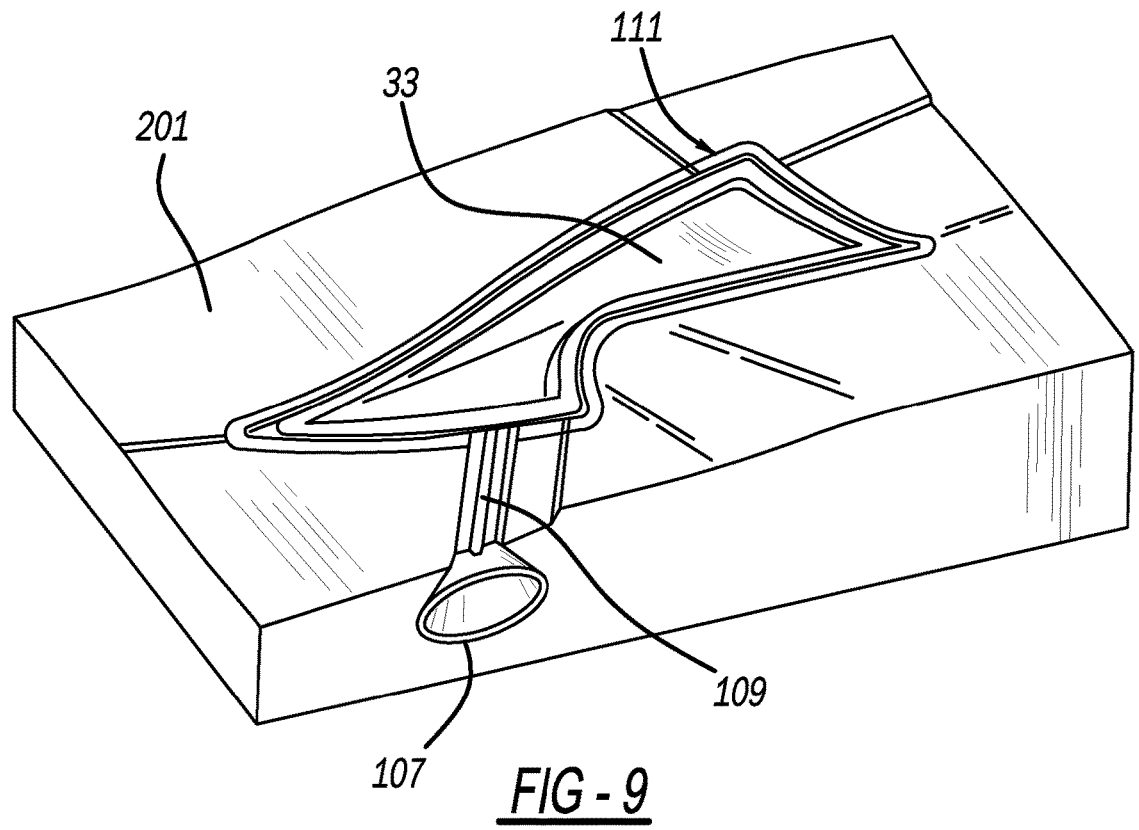
Figure 10:
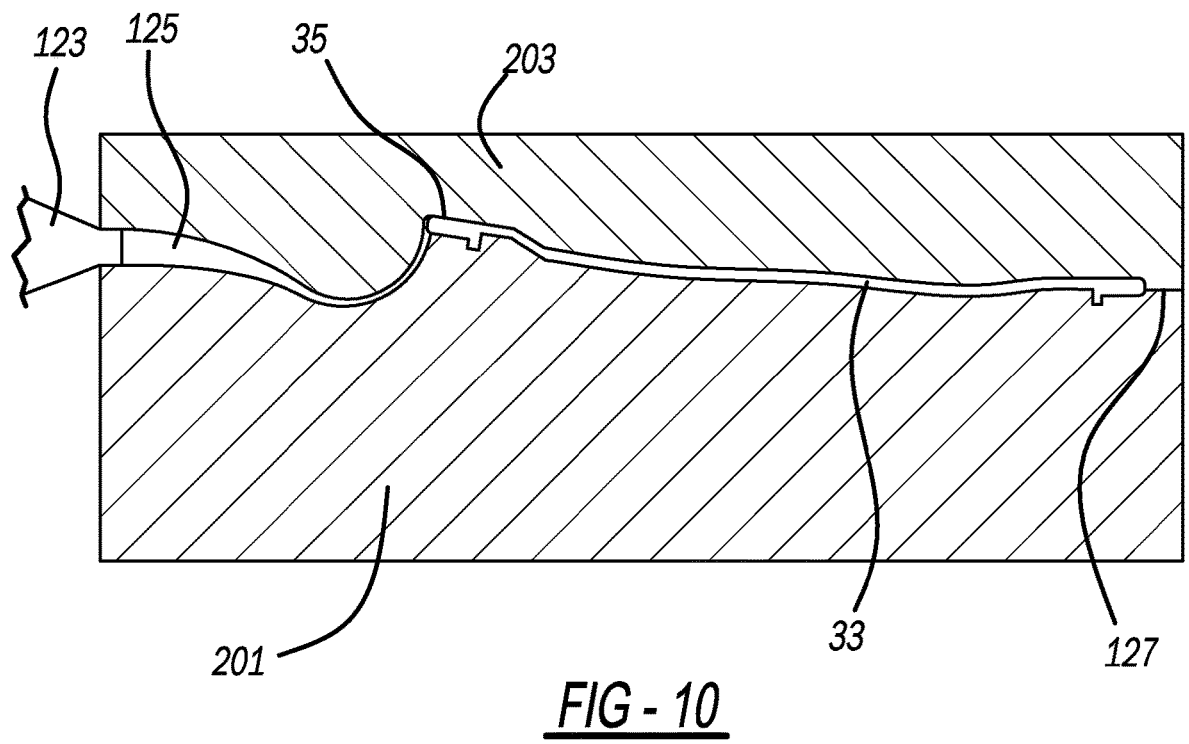
FIG. 10 is a cross-sectional view, taken along line 10-10 of FIG. 8 showing the molds for making the substrate of the present interior trim system.
Figure 11:
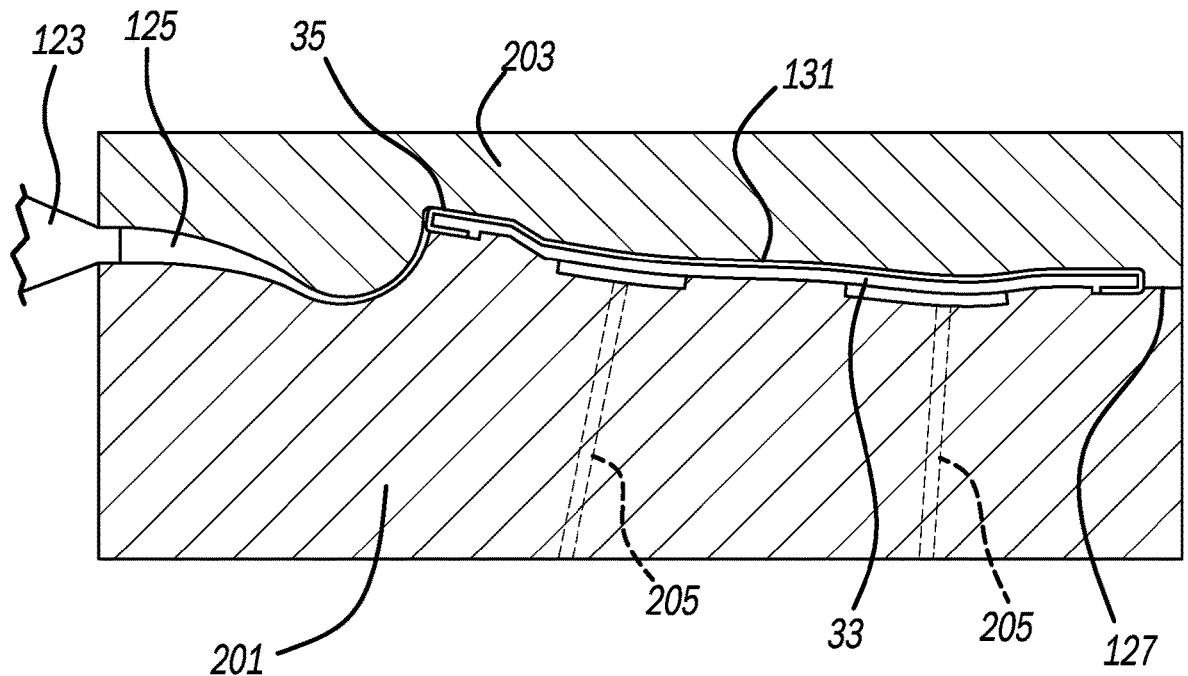
FIG. 11 is a fragmentary, cross-sectional view, taken along line 11-11 of FIG. 8, showing the molds for making the skin of the present interior trim system.
Figure 12:
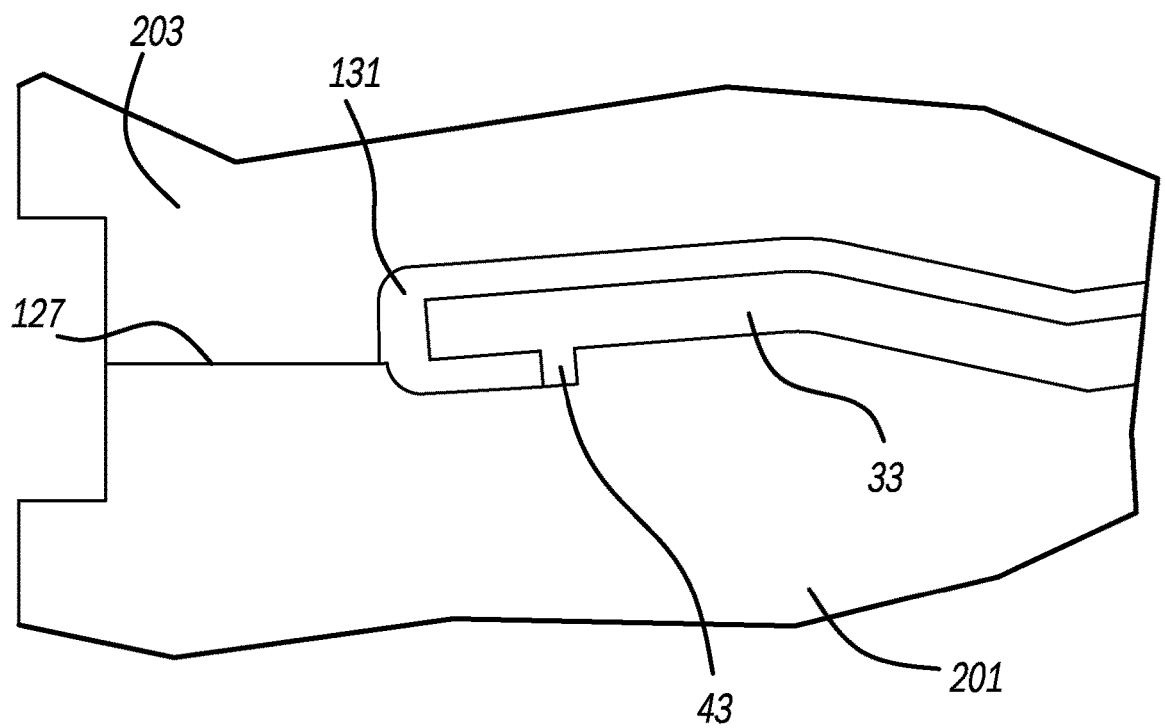
FIG. 12 is an enlarged cross-sectional view showing the molds with the skin-on-substrate assembly formed therein of the present interior trim system.

Next, movable substrate mold 103 is horizontally opened to the position shown as 103' relative to stationary substrate mold 101. The cooled and formed substrate is then robotically or manually removed from the molds 101 and 103, and then placed onto a stationary lower skin mold 201 when a moveable upper skin mold 203 is in a vertically raised position as shown in FIG. 6. The hydraulic press then clamps shut upper skin mold 203 onto lower skin mold 201, to the position shown as 203' in FIG. 7. In this closed orientation, a gap or cavity 111 is defined between an internal surface 131 of upper skin mold 203 and a portion of an internal surface of lower skin mold 201 on one hand, and the adjacent but spaced apart surfaces of substrate 33. Vacuum pressure is applied via passages 205 in lower skin mold 201 to hold substrate 33 in place during skin molding.

A skin mixing head or nozzle 123 (in FIG. 10 which corresponds to 107 in FIG. 9) then interfaces with a gate 125 (in FIG. 10 which corresponds to 109 in FIG. 9) at a parting line of skin molds 201 and 203. Skin 35 is a liquid composition of thermoplastic polyurethane created by injecting a polyol base material and injecting an isocyanate material into a high pressure mixing head. Optional additives, such as light and UV stabilizers, compatibilizers, color pigments, and the like may also be added. These are then mixed together in the head.

Subsequently, the liquid skin polymer is injected into the skin cavity. Hence, as the liquid skin polymer flows throughout skin cavity 131, filling up the open space between the outer and edge surfaces of substrate 33 and the skin molds, wall 43 will act as a dam to block the backside flow of the skin polymer, as can best be observed in FIG. 12. This will form a terminating backside edge of skin 35 abutting against wall 43. Alternately, a projecting surface of mold 201 may replace the substrate wall to terminate the backside flow of the skin in some configurations. Skin 35 is then cooled in the skin molds using, for example, a Thermolator® temperature control and fluid cooling system. Finally, the integrally over-molded trim panel is removed from the molds, such as with a positive air pressure through passages 205, via ejector pins, picking robots or manually, without the need for subsequent skin wrapping or foaming between the skin and substrate.

If inserts, such as fastener or reinforcement bracket members are used, then they may optionally be directly molded or, alternately separately formed and then inserted, directly into a recess into the substrate mold prior to molding the substrate therein. The present system also encompasses the substrate and/or skin molding tool shapes and configurations themselves. Moreover, the present system also pertains to a trim panel product manufactured according the disclosed methods and processes.

The foregoing description of the embodiments has been provided for purposes of illustration and description, however, variations thereof are envisioned. For example, the trim panels may be differently shaped. Also, while automotive vehicle interior trim panels have been disclosed, trim panels for residential, industrial or recreational use may also employ the present methods and constructions, although some advantages may not be achieved. Furthermore, the present interior trim panel can alternately be used in other transportation vehicles including airplanes, watercraft and train cars. Individual elements or features of a particular embodiment are generally not limited to that particular embodiment, but, where applicable, are interchangeable and can be used in a selected embodiment, even if not specifically shown or described, and all of the dependent claims may be multiply dependent in any combination. Such variations are not to be regarded as a departure from the present disclosure, and all such modifications are intended to be included within the scope and spirit of the present disclosure.

The invention claimed is:

1. A method of manufacturing a trim panel, the method comprising:
   (a) injecting a liquid substrate polymer into a first mold cavity to create a substrate;
   (b) clamping a backside mold against a frontside mold to define a second mold cavity, the backside mold including a single-piece and continuous surface comprising a substrate-contacting section and a skin-contacting section, and a backside of the substrate created in step (a) being located against the substrate-contacting section in the second mold cavity;
   (c) injecting a liquid skin polymer into the second mold cavity to create a skin on the substrate created in step (a);
   (d) causing the skin polymer to directly adhere to a middle portion of a face of the substrate during step (c);
   (e) causing the liquid skin polymer to wrap around at least one peripheral edge of the substrate and adhere to the backside of the substrate during step (c); and
   (f) the wrap around portion of the skin polymer contacting against the skin-contacting section of the backside mold.

2. The method of claim 1, further comprising causing the skin polymer to wrap around at least two peripheral edges of the substrate and adhere to the back side of the substrate during the injection of the liquid skin polymer, and the skin having a Shore A hardness of 33-90 to provide a soft feel with resilient compressibility.

3. The method of claim 1, further comprising causing the liquid skin polymer to wrap around all peripheral edges of the substrate and adhere to the back side of the substrate during the injection of the liquid skin polymer, and the substrate polymer comprises at least one of: ABS, PC-ABS, SLA or PP.

4. The method of claim 1, further comprising:
   cooling the liquid skin polymer in skin molds after the liquid skin polymer has been injected;
   removing the cooled skin and the substrate as a single piece, over-molded interior trim panel from the skin molds;
   the outer surfaces of the substrate and the skin being three-dimensionally curved along their length; and
   the skin having a Class-A appearance surface, a soft feel and being more compressible than is the substrate after the over-molded interior trim panel is removed.

5. The method of claim 1, further comprising:
   feeding polyol into a mixing head;
   feeding isocyanate into the mixing head;
   mixing the polyol and the isocyanate together in the mixing head;
   the mixing head thereafter performing the injecting of the liquid skin polymer;
   the liquid skin polymer being thinner than the substrate; and the substrate being more rigid than the skin after they are removed from the molds.

6. A method of manufacturing a trim panel, the method comprising:
(a) injecting a liquid substrate polymer into a first mold cavity to create a substrate;
(b) injecting a liquid skin polymer into a second mold cavity to create a skin on the substrate created in step (a);
(c) causing the skin polymer to adhere to a face of substrate during step (b), including adhering the skin polymer to a middle portion of the face of the substrate;
(d) causing the liquid skin polymer to wrap around at least one peripheral edge of the substrate and adhere to a backside of the substrate during step (b);
(e) contacting the backside of the substrate with a single-piece skin mold which also contacts against the skin polymer;
(f) flowing the substrate polymer to engage with a metallic fastener or metallic bracket to cause the fastener or the bracket to be attached to the backside of the substrate while the substrate is located in the first cavity; and
(g) stopping a flow of the skin polymer within the second mold cavity by the skin polymer abutting against a wall integrally extending from and molded as part of the backside of the substrate.

7. The method of claim 1, wherein:
the substrate polymer comprises at least one of: ABS, PC-ABS, SLA or PP;
the liquid skin polymer comprises urethane;
the substrate, after removal from the first cavity, is 1.5-4 mm thick;
the skin, after removal from the second cavity, is 0.5-1 mm thick; and
the skin, after removal from the second cavity, has a Shore A hardness=33–68.

8. The method of claim 6, further comprising creating an over-molded, automotive vehicle interior trim panel from the skin and the substrate, and the bracket or the fastener being located between portions of the skin polymer located on the backside of the substrate.

9. The method of claim 6, further comprising creating an over-molded, automotive vehicle: instrument panel or a floor-mounted center console panel, from the skin and the substrate, and the bracket or the fastener being located between portions of the skin polymer located on the backside of the substrate.

10. The method of claim 1, further comprising damming a flow of the liquid skin polymer within the second cavity by the liquid skin polymer abutting against a wall that is substantially parallel to an adjacent peripheral edge of the substrate, and the wall contacting against an adjacent skin mold.

11. The method of claim 1, further comprising:
opening the molds at a stepped parting line after the skin polymer has cooled therein;
an edge wrapped portion of the skin being located at the parting line with an outer face portion of the skin being on one side of the parting line and a backside portion of the skin being on an opposite second side of the parting line; and
the skin having a substantially J-cross-sectional shape between the outer face, edge wrapped and backside portions thereof such that the outer face and backside portions are substantially parallel.

12. A method of manufacturing a trim panel, the method comprising:
(a) inserting a liquid polymeric material between substrate molds to create a substrate;
(b) cooling the polymeric substrate in the substrate molds;
(c) inserting a liquid urethane against the cooled polymeric substrate to create a cover;
(d) applying vacuum pressure to retain the polymeric substrate during insertion of the urethane;
(e) flowing the liquid urethane around at least a majority of a periphery of the cooled polymeric substrate and extending the liquid urethane onto a backside of the polymeric substrate;
(f) stopping the flow of the urethane on the backside with a damming surface projecting in a continuous manner substantially parallel to the peripheral edge of the substrate;
(g) cooling the liquid urethane after it has been inserted;
(h) creating an over-molded, automotive vehicle, interior trim panel from the cooled cover and the cooled polymeric substrate;
(i) causing the cover to have a Class-A appearance surface, a soft feel and be more compressible than is the polymeric substrate after the cooling;
(j) performing a cycle of steps (a)-(i) within five minutes;
(k) wherein the vacuum pressure is applied to the backside of the polymeric substrate, via multiple passageways in an associated one of the molds, between portions of the urethane located on the backside of the polymeric substrate; and
(l) causing the cover to wrap around all peripheral edges of the substrate, adhere to a middle portion of a face side of the substrate, and adhere to the backside of the substrate during the flowing of the cover.

13. The method of claim 12, further comprising:
feeding polyol into a mixing head;
feeding isocyanate into the mixing head;
mixing the polyol and the isocyanate together in the mixing head;
the mixing head thereafter performing the inserting of the urethane which includes pressurized injection into a mold gate;
the cooled cover being thinner than the cooled substrate; and
the cooled substrate being more rigid than the cooled cover.

14. The method of claim 12, further comprising flowing the liquid material to engage with a metallic fastener or metallic bracket to cause the fastener or the bracket to be attached to the backside of the substrate, between portions of the urethane located on the backside of the substrate, while the substrate is located between the substrate molds.

15. The method of claim 12, wherein:
the liquid material for the substrate comprises at least one of: ABS, PC-ABS, SLA or PP;
the cooled substrate is 1.5-4 mm thick;
the cooled cover is 0.5-1 mm thick; and
the cooled cover has a Shore A hardness=33–90.

16. The method of claim 12, wherein the over-molded, automotive vehicle trim panel is at least one of: an instrument panel or a floor-mounted center console panel.

17. The method of claim 12, further comprising the skin mold including a single-piece comprising a substrate-contacting section and a skin-contacting section with the damming surface located between the sections.

18. The method of claim 12, further comprising:
opening a second skin mold at a stepped parting line after the urethane has cooled between the skin molds;
an edge wrapped portion of the cover being located at the parting line with a Class-A portion of the cover being on one side of the parting line and a backside portion of the cover being on another side of the parting line; and
the cover having a substantially J-cross-sectional shape adjacent a peripheral edge of the substrate such that the Class-A and backside portions are substantially parallel.

19. A method of manufacturing a trim panel, the method comprising:
(a) injecting a liquid polymer between substrate molds to create a substrate;
(b) cooling the substrate in the substrate molds;
(c) injecting a liquid urethane into a cavity directly against the substrate to create a skin;
(d) flowing the urethane around at least one peripheral edge of the cooled substrate and extending the urethane onto a minority portion of a backside of the substrate;
(e) stopping a flow of the urethane within the cavity by the urethane abutting against a wall integrally extending from and molded as part of the backside of the substrate;
(f) cooling the urethane after it has been injected into the cavity;
(g) the cooled substrate being 1.5-4 mm thick;
(h) the cooled skin being 0.5-1 mm thick; and
(i) the cooled cover having a Shore A hardness=33–90, which is softer than the substrate.

20. The method of claim 19, further comprising causing the urethane, which is a thermoplastic polyurethane, to wrap around all peripheral edges of the substrate and adhere to the back side of the substrate during the flowing step.

21. The method of claim 19, further comprising:
using vacuum pressure to hold the substrate in the cavity;
opening the cavity at a parting line after the urethane has cooled therein;
an edge wrapped portion of the skin being located at the parting line with a Class-A portion of the skin being on one side of the parting line and a backside portion of the skin being on another side of the parting line such that the Class-A and backside portions are substantially parallel; and
creating an over-molded, automotive vehicle interior trim panel from the skin and the substrate, where the skin covers an entire outer surface of the substrate.

22. The method of claim 19, further comprising creating an over-molded, automotive vehicle: instrument panel or a floor-mounted center console panel, from the skin and the substrate.

23. The method of claim 19, wherein a damming surface of the wall projects in a continuous manner substantially parallel to the peripheral edge of the substrate, further comprising contacting the backside of the substrate with a single-piece skin mold which also contacts against the urethane.

24. The method of claim 19, wherein opposing faces of the wall are substantially perpendicular to adjacent portions of the backside of the substrate, and a distal end of the wall extends beyond the urethane.

* * * * *